Oct. 21, 1958  R. E. RICHARDSON  2,856,734
GLASS BENDING MOULDS
Filed June 18, 1956  4 Sheets-Sheet 1

INVENTOR:
RONALD E. RICHARDSON
BY Cushman, Darby & Cushman
ATTORNEYS

Oct. 21, 1958

R. E. RICHARDSON 2,856,734

GLASS BENDING MOULDS

Filed June 18, 1956

INVENTOR:
RONALD E. RICHARDSON
BY Cushman, Darby+Cushman,
ATTORNEYS

Oct. 21, 1958 R. E. RICHARDSON 2,856,734
GLASS BENDING MOULDS
Filed June 18, 1956 4 Sheets-Sheet 3
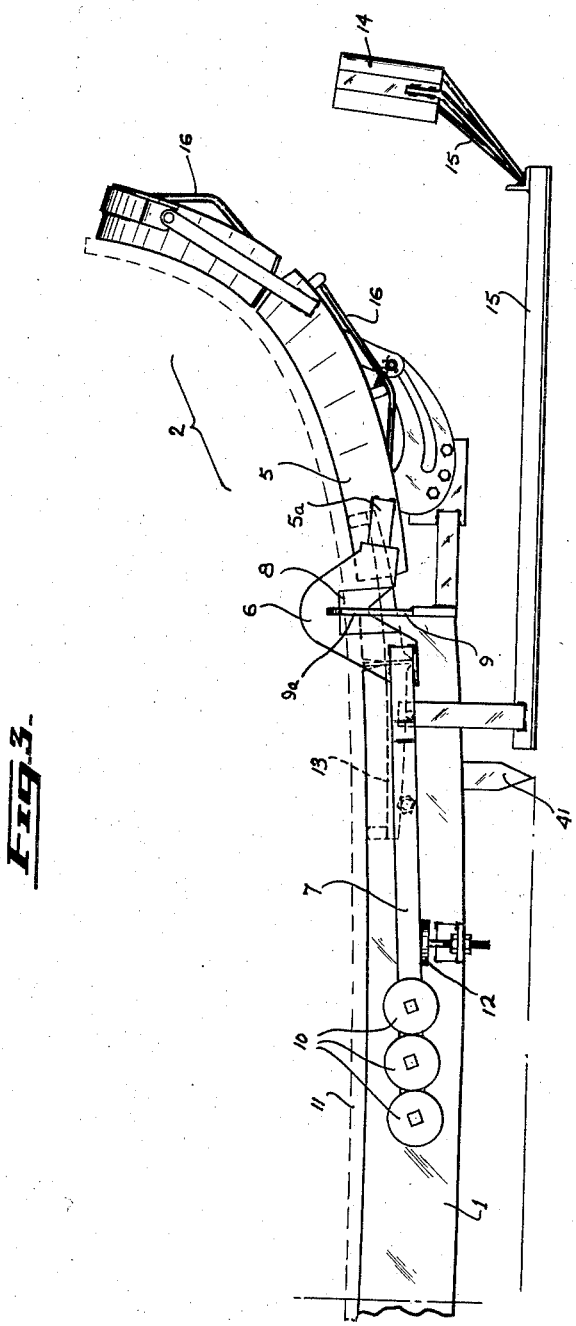
INVENTOR:
RONALD E. RICHARDSON
BY Cushman, Darby & Cushman
ATTORNEYS Oct. 21, 1958 R. E. RICHARDSON 2,856,734
GLASS BENDING MOULDS
Filed June 18, 1956 4 Sheets-Sheet 4

INVENTOR:
RONALD E. RICHARDSON
BY Cushman, Darby & Cushman,
ATTORNEYS

United States Patent Office 2,856,734
Patented Oct. 21, 1958

2,856,734
GLASS BENDING MOULDS

Ronald E. Richardson, Oshawa, Ontario, Canada, assignor to Pittsburgh Plate Glass Company, Pittsburgh, Pa.

Application June 18, 1956, Serial No. 592,111

Claims priority, application Canada July 2, 1955

3 Claims. (Cl. 49—67)

This invention relates to improvements in the construction of moulds such as are employed in the bending of elongated glass sheets to curved form. The advent of "wrap-around" windshields in automobile design has given rise to the need for efficient moulds for the initial processing of the elongated glass sheets that will ultimately form the laminated safety glass of such "wrap-around" windshield. A "wrap-around" windshield consists of an elongated sheet of laminated glass of gentle curvature at its centre, the radius of curvature decreasing sharply at each end until the glass is extending almost perpendicular to the main body of the glass.

The technique employed in forming such "wrap-around" windshields, or like objects of curved laminated glass for automobile rear windows or other applications, is to lay a pair of flat elongated glass sheets on a mould which is so arranged as to tend to take up its final configuration when so permitted by the softening of the glass. The mould and glass sheets are passed through a furnace in which the glass is raised to a temperature sufficient to render it yieldable to the forces exerted upon it by the mould. In this manner the required shape is imparted to the glass. Subsequently the two sheets are annealed, an intermediate lamination of a synthetic resinous material is placed between them and they pass to the rolling and pressure treatments before emerging as a finished product. A similar bending operation is employed in manufacturing the tempered type of non-laminated safety glass.

The present invention is concerned with the construction of moulds for the preliminary bending of one or more such sheets during passage through a furnace.

It has become the practice to form moulds for this purpose with pivoted end portions each of which either can be swung into a first position (when the flat, cold glass is originally placed in position thereon) subsequently referred to as the "flat" position of the mould, or can move into a second position (the "curved" position of the mould) as the resistance to bending of the glass decreases on exposure to higher temperatures. Weights tending to urge the movable portions of the mold into such latter positions are normally provided.

Difficulty has been experienced in the past in obtaining smooth movement of such end portions of the mould, such as to ensure regular and controlled bending of the glass. There has been a tendency for the movable end portions of the mould first to bind in one position and then to move jerkily as the glass softens, producing highly disadvantageous effects on the smoothness of curvature of the finished glass. It is believed that these difficulties are due to excessive friction in the hinge devices that have in the past been employed in glass bending moulds of this character.

It is the object of the present invention to provide hinge means in such a glass bending mould, in which the friction between the two parts connected by the hinge means is maintained both as small as possible and as uniform as possible.

To this end, the invention in its broad aspect consists of a glass bending mould having a main mould portion and at least one subsidiary mould portion pivotally connected to said main mould portion, wherein such pivotal connection comprises a knife edge secured to one of said portions and co-operating with a groove formed on the other of said portions. Preferably, a pair of knife blades each with a co-operating groove is employed, one disposed on each side of the mould.

Glass bending moulds normally fall into one of two classes—concave moulds or convex moulds—depending on whether the glass is cradled within a concavely curved mould or wrapped around a convexly curved one. The present invention is equally applicable to use with either class of mould. It will, however, only be exemplified below with reference to a concave mould, its use with a convex mould being analogous.

In a more specific form the invention may thus be defined as a glass bending mould of the concave type having a main mould portion in the form of a pair of spaced generally parallel bars, and at least one generally V-shaped end mould portion pivotally connected to one end of said main mould portion so that the bars of said end mould portion are each contiguous with the end of one of said bars of the main portion in the concave position of the mould, wherein such pivotal connection comprises a pair of knife edges secured to said main mould portion and each situated at the end of one of the bars thereof and positioned to form extensions of one another and thus form a line of pivoting, and a pair of members secured to the end of each bar of said end mould portion, said members being formed with grooves positioned to co-operate with said knife edges.

One half of a concave "skeleton" type mould embodying the invention is illustrated by way of example in the accompanying drawings. The other half of the mould is identical in mirror image, and has thus not been illustrated.

Figure 3 is a view similar to Figure 2 but with the parts in the "curved" (in this type of mould "concave") position assumed after bending of the glass;

Figure 5:
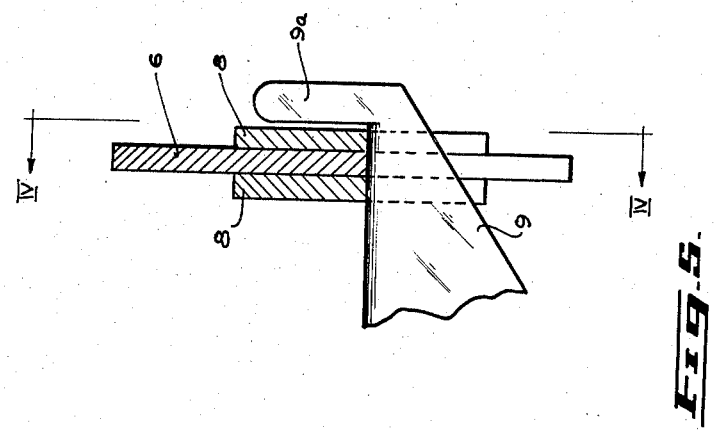
Figure 5 is an end view of the fragment seen in Figure 4.
Figure 4:
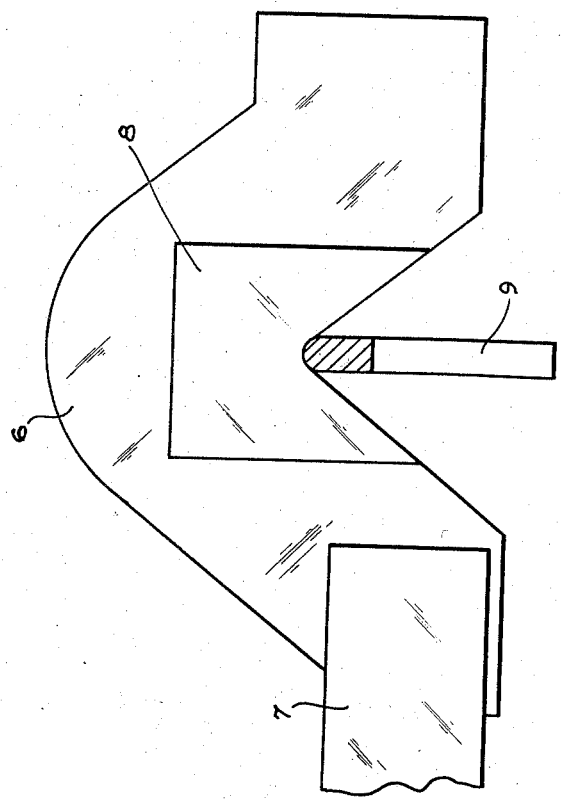
Figure 4 is an enlarged side view of a fragment of this mold taken on the line IV—IV in Figure 5.

The main side bars of the mould are each designated by the reference numeral 1, the movable end portion at the end of the mould visible in the drawings, being shown generally at 2. This movable end portion 2 is itself composed of two relatively movable mould sections 3 and 4. The detailed structure of the end portion 2 of the mould and the nature of the relative movement between the sections 3 and 4 form the subject matter of copending United States patent application Serial No. 591,913 and will not be elaborated upon further in this specification. Suffice to say that the mould section 3 consists of a pair of side bars 5, each of which is arranged, in the concave position of the mould (Figure 3), to form a contiguous smooth continuation of a main side bar 1. The end of each side bar 5 adjacent the end of a main side bar 1 is secured by suitable struts 5a to an arched bracket 6 to which there is further secured an arm 7 extending generally away from the end portion 2 and, when the parts are in the "flat" position of Figures 1 and 2, upwardly at an angle approximately equal to that through which it is desired to pivot the end portion 2 of the mould. As will appear from Figures 1, 4 and 5, which latter are enlarged side and end views of a bracket 6 and its associated parts, reinforcing side plates 8 are secured to each side surface of such bracket. A vertically disposed upstanding plate 9 is secured to the end of each main side bar 1 to extend perpendicularly outwardly therefrom. The upper edge of each plate 9 is rounded off to semi-circular cross-section and serves to define the axis about which the end portion 2 of the mould rotates. The inner apices of the brackets 6 and reinforcing plates 8 are made similarly arcuate to form a complementary surface that will be readily able to slide smoothly over the upper edges of the plates 9 on pivotal movement of the end portion 2 of the mould between the positions seen in Figures 2 and 3. Each plate 9 terminates at its outward end in an upwardly projecting finger 9a. The two fingers 9a accurately determine the transverse alignment of the end portion 2 in relation to the main portion of the mould and thus ensure registration of the side bars 1 and 5.

Figure 1:
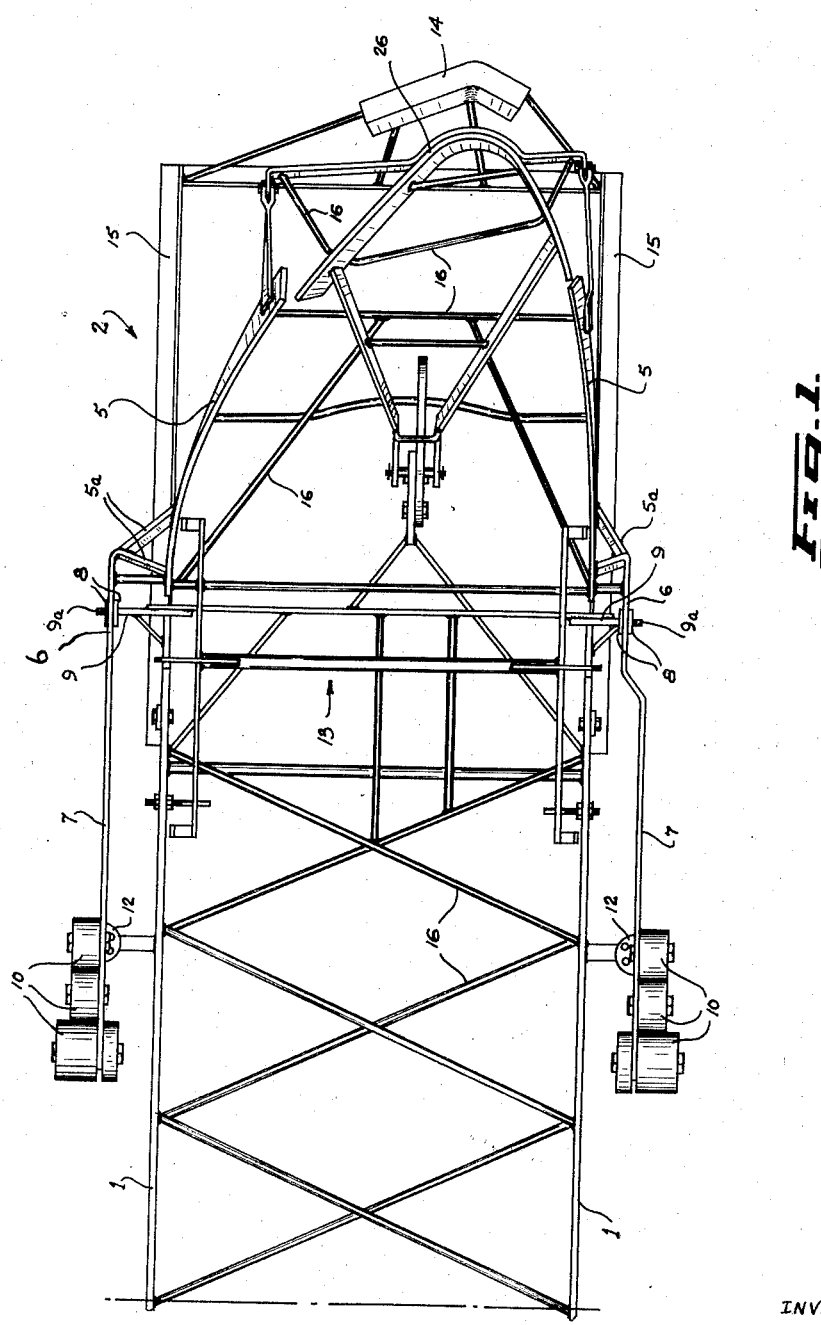
Figure 1 shows a plan view of the mould half in the initial "flat" position of the parts prior to bending of the glass.
Figure 2:
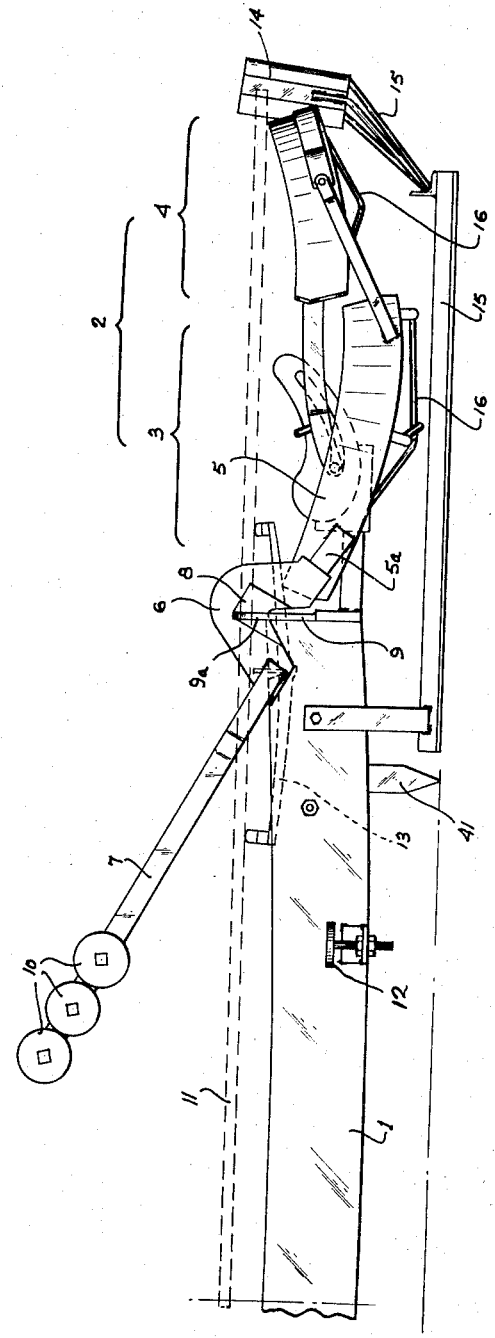
Figure 2 is a side view of the part of the mould half seen in Figure 1, with the parts in the same position.

Weights 10 are secured to the extreme ends of the two arms 7, these arms being disposed outwardly of the side bars 1 of the mould, as best seen from Figure 1, in order to be free to move downwardly without encountering the glass sheet which overlaps the edges of the bars 1 by a small amount (generally about half an inch). Normally, in practice, when the mould is being employed as a step in the manufacture of laminated windshields, two sheets of glass, one on top of the other, will be laid along the top of the mould so as to be bent simultaneously and thus always match one another perfectly. This pair of glass sheets is shown diagrammatically by broken lines 11 in Figures 2 and 3. The weight and rigidity of the glass 11 will prevent upward movement of each end portion 2 of the mould, the tip 26 of which end portion presses upwardly against the underside of the glass 11 at its extreme end. The parts will remain in the position seen in Figure 2 against the force exerted by the weights 10, until the glass begins to soften as a result of increasing temperatures that it encounters on being fed on a continuously moving belt through an oven. Gradually the upward bending force exerted by the weights 10 will take charge and the glass will allow each of the end portions 2 to swing slowly and uniformly upward, until the two arms 7 each come to rest on one of a pair of adjustable stops 12 mounted each on the outside of one of the side bars 1 of the mould. The parts will then be in the position illustrated in Figure 3 and the glass 11 will be smoothly bent to the required shape. It will be noted that the main body of the glass sags sufficiently to bring its edges into contact with the full length of the side bars 1. The degree and area of application of heat, combined with the comparatively narrow transverse dimension of the mould, normally permit no significant transverse sagging, although transverse sagging can be provided for if desired.

The use in a glass bending mould, of the type of pivotal connnection consisting of rounded knife edge with a complementary co-operating groove, is found to provide a very smoothly operating mould with consequent improvements in the quality of glass produced thereby. It is not essential for the knife edge to be formed on a part of the fixed main portion of the mould. If desired it may be secured to the movable end portion, while the main portion carries the co-operating groove. Moreover, the degree of rounding of the knife edge may be varied as necessary. It may be reduced so as to produce virtually a sharp knife blade edge, but some degree of curvature will normally be desirable having regard to the class of steel from which the mould will be made and the comparatively rude treatment that the mould will experience in use.

The drawings also illustrate a further device known as a "teeter" which may conveniently be incorporated in the same mould as the knife edge bearings. This teeter device which is shown generally at 13 is the subject of co-pending United States patent application Serial No. 592,194.

Other parts of the mould visible in the drawings are a thermal ballast device 14 the function of which is described in the former of said co-pending applications concerned with the construction and operation of the end portion 2; supporting members 15 for such thermal ballast device 14; conventional bracing members 16 extending between the side bars 1 and between parts of the end portion 2 such as side bars 5; conventional supporting legs 41; and other parts not germane to the present invention and described in detail in one of said co-pending applications. Certain of the bracing members 16 that connect the parts of the sections 3 and 4 of the end portion 2 project somewhat downwardly from these sections in order to reduce the mass of metal closely adjacent the glass sheet and thus minimize local cooling effects thereon.

I claim:

1. A glass bending mould having a main mould portion and at least one subsidiary mould portion pivotally connected to said main mould portion, wherein such pivotal connection comprises a knife edge secured to one of said portions and co-operating with a groove formed on the other of said portions.

2. A glass bending mould having a main mould portion and at least one subsidiary mould portion pivotally connected to said main mould portion, wherein such pivotal connection comprises a pair of knife edges secured to said main mould portion co-operating with a pair of grooves formed in a member secured to said subsidiary mould portion.

3. A glass bending mould of the concave type having a main mould portion in the form of a pair of spaced generally parallel bars, and at least one generally V-shaped end mould portion pivotally connected to one end of said main mould portion so that the bars of said end mould portion are each contiguous with the end of one of said bars of the main portion in the concave position of the mould, wherein such pivotal connection comprises a pair of knife edges secured to said main mould portion and each situated at the end of one of the bars thereof and positioned to form extensions of one another and thus form a line of pivoting, and a pair of members secured to the end of each bar of said end mould portion, said members being formed with grooves positioned to co-operate with said knife edges.

References Cited in the file of this patent
UNITED STATES PATENTS

| | | |
|---|---|---|
| 760,959 | Connington | May 24, 1904 |
| 2,021,061 | Hedman | Nov. 12, 1935 |
| 2,121,481 | Flumerfelt | June 21, 1938 |
| 2,348,279 | Boyles et al. | May 9, 1944 |
| 2,688,210 | Gendrisak | Sept. 7, 1954 |

FOREIGN PATENTS

| | | |
|---|---|---|
| 1,089,973 | France | Oct. 3, 1954 |